United States Patent
Muckle

(10) Patent No.: US 10,823,324 B2
(45) Date of Patent: Nov. 3, 2020

(54) METHOD OF LINING A TUBULAR STRUCTURE

(71) Applicant: RADIUS SYSTEMS LIMITED, South Normanton, Alfreton Derbyshire (GB)

(72) Inventor: Derek Muckle, Long Whatton Leicestershire (GB)

(73) Assignee: RADIUS SYSTEMS LIMITED, Alfreton Derbyshire (GB)

(*) Notice: Subject to any disclaimer, the term of this patent is extended or adjusted under 35 U.S.C. 154(b) by 202 days.

(21) Appl. No.: 15/523,073

(22) PCT Filed: Oct. 13, 2015

(86) PCT No.: PCT/GB2015/053002
§ 371 (c)(1),
(2) Date: Apr. 28, 2017

(87) PCT Pub. No.: WO2016/066991
PCT Pub. Date: May 6, 2016

(65) Prior Publication Data
US 2017/0314722 A1  Nov. 2, 2017

(30) Foreign Application Priority Data
Oct. 29, 2014  (GB) .................................. 1419246.2

(51) Int. Cl.
| | |
|---|---|
| *F16L 55/165* | (2006.01) |
| *B29C 63/34* | (2006.01) |
| *B29C 63/46* | (2006.01) |
| *F16L 58/10* | (2006.01) |
| *B29L 23/00* | (2006.01) |

(52) U.S. Cl.
CPC ........ *F16L 55/1654* (2013.01); *B29C 63/343* (2013.01); *B29C 63/46* (2013.01); *F16L 55/1657* (2013.01); *F16L 58/1036* (2013.01); *B29L 2023/22* (2013.01); *Y10T 29/4994* (2015.01); *Y10T 29/49732* (2015.01); *Y10T 29/49865* (2015.01)

(58) Field of Classification Search
CPC . F16L 55/163; F16L 58/1036; F16L 55/1654; F16L 55/1657; F16L 55/165; B29C 63/343; B29C 63/46; B29L 2023/22; Y10T 29/49732; Y10T 29/4994; Y10T 29/49865; Y10T 29/49885
See application file for complete search history.

(56) References Cited

U.S. PATENT DOCUMENTS

| | | | | |
|---|---|---|---|---|
| 3,856,905 A | * | 12/1974 | Dawson ............... | B29C 49/0015 138/98 |
| 4,377,894 A | * | 3/1983 | Yoshida ................ | B23P 11/025 138/140 |
| 5,000,369 A | * | 3/1991 | Shotts .................... | B21C 37/09 156/187 |
| 5,054,679 A | * | 10/1991 | Shotts .................... | B21C 37/09 228/17.5 |
| 5,114,634 A | | 5/1992 | McMillan et al. | |
| 5,256,342 A | | 10/1993 | McMillan et al. | |
| 5,340,524 A | | 8/1994 | McMillan et al. | |
| 5,645,784 A | * | 7/1997 | McMillan ............... | B29C 53/20 264/229 |
| 5,810,053 A | | 9/1998 | Mandich | |
| 8,813,332 B2 | * | 8/2014 | Leibfried .............. | E21B 36/003 29/402.08 |
| 2008/0196900 A1 | * | 8/2008 | Leibfried .............. | E21B 36/003 166/380 |
| 2010/0122767 A1 | * | 5/2010 | Taylor ..................... | B29C 63/36 156/294 |

FOREIGN PATENT DOCUMENTS

| | | |
|---|---|---|
| EP | 0 266 951 A2 | 5/1988 |
| EP | 0 341 941 A1 | 11/1989 |
| EP | 0 834 034 A1 | 4/1998 |
| FR | 2 854 938 A1 | 11/2004 |
| WO | WO 96/37725 A1 | 11/1996 |
| WO | WO 2007/023255 A1 | 3/2007 |

OTHER PUBLICATIONS

UKIPO Combined Search and Examination Report for GB 1419246.2 dated Apr. 21, 2015, 5 pages.
PCT International Search Report and Written Opinion of ISA for PCT/GB2015/053002 dated Jan. 7, 2016, 12 pages.
PCT Written Opinion of International Preliminary Examining Authority for PCT/GB2015/053002 dated Sep. 22, 2016, 6 pages.
PCT International Preliminary Examination Report for PCT/GB2015/053002 dated Feb. 7, 2017, 13 pages.

* cited by examiner

*Primary Examiner* — Sarang Afzali
(74) *Attorney, Agent, or Firm* — Patterson Thuente Pedersen, P.A.

(57) ABSTRACT

Method of lining a tubular structure with a plastics liner pipe comprising the steps of: —temporarily reducing an outside diameter of the liner pipe by passing the liner pipe through a roller system; —cooling the liner pipe once its outside diameter has been reduced and applying a thermal restraint; —transporting the liner pipe to an installation site remote from the roller system; —removing said thermal restraint; and —installing the liner pipe in said tubular structure at said installation site.

18 Claims, No Drawings

METHOD OF LINING A TUBULAR STRUCTURE

RELATED APPLICATIONS

The present application is a National Phase entry of PCT Application No. PCT/GB2015/053002, field Oct. 13, 2015, which claims priority from GB Patent Application No. 1419246.2, filed Oct. 29, 2014, said applications being hereby incorporated by reference herein in their entirety.

This invention relates to a method of lining a tubular structure, for example a fluid transport pipeline, with a plastics liner pipe.

BACKGROUND

There are many practical reasons why it is beneficial to internally line pipelines with plastic (usually polymer, for example polyethylene) liner pipes. For new pipelines, it can permit the installation of corrosion and/or an abrasion resistant layer to be installed after the pipeline string has been constructed (for example, a welded steel pipeline) such that a continuous liner is achieved of known quality. For old pipelines, whether above ground or buried below ground, liners are installed to modernise the structure (for example to improve drinking water quality) or to renovate old pipelines at the end of their original design life.

There are well known techniques that make use of the elastic properties of polymer pipes so that a pipe is deformed using a diameter reduction tool, making its outside diameter temporarily smaller than the host pipe into which it is going to be installed. This allows the liner pipe to be inserted into the host pipe and then it is subsequently allowed to expand to a close or tight fit on the inner surface of the host pipe. Generally these techniques use either a system of rollers or tapered die systems to effect the diameter reduction. Examples of this technique include:

EP0266951 (Whyman et al, Dupont, 1986) describes a method of lining a pipe section with a polymer tubular liner wherein the liner is pulled through diameter reducing rollers that are adjusted so that the resulting outside diameter of the liner (while under a diameter reducing stress) is sufficiently smaller than the inside section of the pipe section to be lined allowing the liner to be pulled through. On releasing the diameter reducing stress, and releasing the stress on the liner in turn, the liner expands into contact with the inside of the pipe section. The rollers are so designed, and mechanically driven, to maintain the tensile stress on the polymer liner below the tensile yield limit of the polymer. It is specified that the diameter reducing stress is achieved by holding the liner under tension after it exits the roller assembly.

EP0341941 (Mcquire, British Gas, 1988) discloses an alternative method of lining a pipe section with a polymer tubular liner wherein the liner is pulled through a static die of generally tapered profile so that the resulting outside diameter of the liner (while under a diameter reducing stress) is smaller than the inside diameter of the host pipe to be lined allowing it to be inserted. The removal of the diameter reducing stress (applied by the use of a winch cable to apply a continuous load to the pipe as it passes through the die drawing process) enables the pipe to elastically recover and expand into contact with the host pipe section.

U.S. Pat. No. 5,340,524 (McMillan et al, Pipe Rehab Int'l Inc., 1994) discloses an alternative method for lining a pipe with a polymer liner. Pipe is drawn through a series of rollers that reduce its diameter in gradual stages. At least one stage of the roller system has rollers that are mechanically powered to draw the pipe through the reduction process and the insertion of the liner is assisted by the use of a cable winch to pull the pipe through the host pipe. The liner is allowed to expand substantially towards its original outside diameter in order to form a close fit with the liner to the host pipe.

EP0834034 (Weaver, Thames Water, 1996) discloses another approach for lining a pipe with a polymer tubular liner. This method again relates to the use of a sequence of rollers and specifically shows improvements in the number of rollers required and their shape to achieve a reduction in diameter of the pipe. A specific feature of this patent unlike the foregoing is that it is explicit that the polymer liner pipe should be pushed into the diameter reduction rollers and not pulled through the system.

The techniques disclosed in EP0266951 and EP0341941 have in common that a "diameter reducing stress" is required to assist with insertion of the polymer liner. In practice this refers to the need to apply a tensile load to the liner pipe after the diameter reduction stage has taken place. If this is not applied then the liner pipe immediately starts to expand towards its original dimensions and for all practical purposes is impossible to insert inside the host pipe. Usually the host pipe will have an internal diameter only slightly less than the original outside diameter of the liner pipe. To effectively hold the liner pipe at the reduced diameter, a tensile force must be applied to the end of the liner pipe furthest from the diameter reducing tool, the force being at least equal to the elastic force acting within the polymer material that is attempting to contract the length of the polymer liner and cause diameter expansion. The requisite load can be achieved by the use of a cable winch that not only applies the load but is adaptable to the change in length of the liner pipe as it is inserted through the host pipe.

One perceived disadvantage of the technique of holding plastic pipes in tension in the manner described above is the magnitude of the loads that must be managed. On larger installations (1000 mm diameter liners can be installed by the technique described in EP0341941), this can require substantial infrastructure to be installed on site simply to react the forces acting on the tools at each end of the pipe to be lined. This adds considerable complexity and cost to construction as well as giving rise to safety concerns in operation.

Another disadvantage is that the tools for the diameter reduction process must be assembled at the construction site itself and this can render smaller projects that could benefit from the solution uneconomic due to the mobilisation costs involved.

U.S. Pat. No. 5,340,524 does not describe how the liner pipe remains in the reduced diameter state. A winch system is shown as part of the system that combines with mechanically driven rollers to deform the polymer pipe, which is then inserted as part of a continuous process of diameter reduction—introduction into the host pipe and then reversion of the polymer pipe towards its original dimensions to form a close or tight fit within the pipe. This implies that the process must be conducted at the construction site itself with the related mobilisation of major plant.

Another technique that is disclosed in EP0834034. In this patent it is described how a polymer pipe is inserted through a series of rollers having elliptical openings such that having passed through the rollers the diameter of the polymer pipe is reduced by approximately 10%. The liner pipe is "pushed" into the rollers using a machine positioned before the first roller. In practical embodiments, it is the case that a machine that clamps onto the outside of the liner pipe is used to achieve this and the rollers are not mechanically powered.

The patent does not describe how the liner pipe is installed or how the expansion of the liner pipe is achieved.

It is an aim of the invention to address disadvantages associated with the prior art.

BRIEF SUMMARY OF THE DISCLOSURE

In accordance with the present invention there is provided a method of lining a tubular structure with a plastics liner pipe comprising the steps of:
- temporarily reducing an outside diameter of the liner pipe by passing the liner pipe through a roller system;
- cooling the liner pipe once its outside diameter has been reduced and applying a thermal restraint;
- transporting the liner pipe to an installation site remote from the roller system;
- removing said thermal restraint; and
- installing the liner pipe in said tubular structure at said installation site.

Preferably, the tubular structure is a fluid transport pipeline

The plastics liner pipe may be a synthetic polymer pipe, preferably a polyolefin pipe such as a polyethylene pipe.

The step of temporarily reducing an outside diameter of the liner pipe may further comprise temporarily increasing a wall thickness of the liner pipe.

In an embodiment, the liner pipe is pushed through said roller system from the upstream thereof. Preferably, said roller system comprises series of rollers that form elliptical openings through which the liner pipe is passed.

In an embodiment, the step of temporarily reducing the outside diameter of the liner pipe comprises the steps of forcing the pipe from upstream thereof through said roller system, the roller system comprising at least one pair of reducing rollers disposed and configured to present a roll throat of effective ovality wherein the percentage of the difference between the maximum dimension normal to the axes of the rotation and the maximum dimension parallel to the axes of rotation toward the last mentioned dimension is in the range of 5%-30%.

Preferably, the thermal restraint is achieved by holding the liner pipe at a temperature in the range −20° C. to +10° C., optionally at a temperature of +5° C.

In an embodiment, the cooling is achieved by applying the thermal restraint, for example by placing the reduced diameter liner pipe in a temperature conditioned storage container. Alternatively or in addition, the cooling is achieved by quenching the liner pipe in a fluid, for example chilled air or chilled water.

In an embodiment, the liner pipe is transported in a coiled or linear configuration. The transporting step may be performed by a conventional refrigerated transport vehicle. When in a coiled configuration, the temporary reduction in outside diameter and increase in wall thickness permits coiling of a longer length of liner pipe and/or at a smaller bend radius than would otherwise be possible, without a buckling collapse.

In a preferred embodiment, the installation step comprises the steps of:
- allowing the liner pipe to warm to a suitable temperature for installation;
- inserting the liner pipe into the tubular structure by pulling or pushing it there through;
- applying suitable closure fittings to the ends of the liner pipe.

The liner pipe may be filled with hydraulic fluid and the hydraulic fluid pressurised to urge the liner pipe radially outwardly into a close fit with the interior surface of the tubular structure and subsequently the pressurised hydraulic fluid can be removed.

Preferably the method further comprises the step of waiting until the liner pipe has a stable diameter in an unpressurised state then closing the ends using the closure fittings.

Preferably the method further comprises the step of connecting the lined tubular structure to adjacent sections of tubular structure.

The method described in any of the preceding paragraphs is equally applicable to other plastics pipes which are not necessarily liner pipes. According to a further aspect of the invention there is provided a method of preparing a plastics pipe for transport comprising the steps of:
- temporarily reducing an outside diameter of the pipe by passing the pipe through a roller system;
- cooling the pipe once its outside diameter has been reduced and applying a thermal restraint;
- transporting the pipe to an installation site remote from the roller system;
- removing said thermal restraint; and
- installing the pipe at said installation site.

Further features of the invention are defined in the appended claims.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described in connection with one embodiment are applicable to all embodiments, unless such features are incompatible.

DETAILED DESCRIPTION

The methods described herein are concerned with providing a means of installing a polymer liner pipe to the inside surface of a tubular structure such as a pipe but doing this without the need to mobilise capital equipment to the installation site or construction zone. This is achieved by preparing the liner pipe (by temporarily reducing its diameter) at a site remote from the installation site and holding the liner pipe at the temporarily-reduced diameter by storage and/or transport of the liner pipe at low temperatures i.e. with a thermal restraint applied thereto. Pipes deformed in this way can be transported as individual lengths, or preferably in a continuous length stored in a coiled format, to a construction site or installation site wherein they can be inserted and subsequently reverted towards their original diameter by removal of the thermal restraint and preferably with the application of internal pressure. By this method, specialist lining equipment and infrastructure is not required at the installation site.

As described above, various techniques are known for temporarily reducing the diameter of liner pipes. The rate of expansion of the liner pipe towards its original diameter ("reversion") differs for each of the major known techniques. Techniques such as those disclosed in EP0341941 are very specific in their requirement for a means to provide tools to oppose the elastic memory in the polymer material. An example of this can be shown by the recovery profile for a 160 SDR 26 polyethylene pipe that is subject to a die reduction of 10%:
- Whilst held in tension the diameter of the pipe is circa 151.6 mm versus a starting diameter of 160.7 mm in the test specimen Following release of the resisting force the pipe reverts according to the following timeline

| Time off load (mins) | Outside diameter of pipe (mm) |
|---|---|
| 2 | 153.6 |
| 5 | 154.1 |
| 10 | 154.5 |
| 20 | 155.1 |
| 30 | 155.5 |

Over a subsequent period of 20 days the liner stabilised at an outside diameter of 156.7 mm A comparison is the technique disclosed in EP0834034 wherein a similar pipe and diameter reduction are applied but this time no holding force is applied to the pipe as it exits the roller system.

Immediately on exit from the roller unit the profile recovery is shown as

| Time off load (hours) | Outside diameter of pipe (mm) |
|---|---|
| 48 | 149.0 |
| 72 | 149.3 |
| 96 | 150.4 |
| 192 | 150.5 |

It can be seen that the rate of elastic recovery is significantly different between the two techniques which is indicative of different mechanisms at work in the means by which the pipe diameters have been reduced.

Samples left in a standard laboratory conditioned to +23° C. show that after a period of approximately 1 year the die drawn sample (EP0341941) has a diameter of approximately 156 mm and the roll down sample (EP0834034) a diameter of approximately 153 mm.

Generally speaking the deployment of the installation tools for the method described in EP0834034 is the same as all the other methods described, in that the machine for reducing the diameter of the pipe is first sent to the construction or installation site and then a continuous length of pipe is fed into the machine to reduce its diameter. The technique linked to EP0834034 is commonly known as "Rolldown" and, having processed the liner pipe, it is normal to follow the method disclosed in other prior art patents in that the liner pipe is immediately inserted into the tubular structure to be lined. Once inserted, the polymer liner pipe is reverted with the assistance of cold water pressure to accelerate recovery towards the original polymer liner dimensions and a close fit.

Using any of the diameter-reducing techniques described above, it is necessary to install the liner pipe relatively soon after the diameter reduction has taken place. Reversion is highly temperature dependent and if, for example, the installation site is in a hot climate, installation needs to take place quickly. This is particularly the case for liner pipe prepared using methods such as those described in EP0341941. Other techniques require the diameter reduced pipe to be held in tension as it is installed. Consequently, the diameter reduction is always performed at the installation site. Performing the diameter reduction elsewhere would not be considered as it would add to the cost (adding transport costs) and would detrimentally affect installation as the liner pipe may already have reverted to a diameter too large to insert by the time it arrives at the installation site. In particular, if exposed to sunlight (e.g. on the back of an uncovered vehicle), the liner pipe will heat up in a non-uniform manner causing faster reversion of the parts exposed to sunlight. The resulting liner pipe may have a "banana" shape, or non-uniform ovality making it difficult or impossible to butt-fuse sections together and/or to insert the liner pipe into the pipe to be lined.

The methods of the present invention recognise that polymer pipe which has been processed according to the method described in EP0834034 has a surprisingly slow reversion characteristic. A thermal restraint is used to keep the reduced diameter liner pipe at a relatively low temperature in order to significantly further prolong its normal reversion back towards its original diameter. Reversion does not always occur all the way to the original diameter, although that is possible. The prolonging of reversion using the claimed method is so significant that it can appear that reversion has been entirely prevented (within the normal working timescale for installing the liner pipe after being reduced in diameter).

In this way, by applying a thermal restraint, it is possible to delay reversion sufficiently to make it possible to perform the process of diameter reduction remotely from the construction or installation site, for example at a workshop or factory, thus avoiding the mobilisation costs normally associated with this activity. The ability to use commonly available refrigerated transport systems associated with frozen and/or refrigerated foodstuff for example means that existing transport infrastructure can be used for the supply of pipes to the installation site which achieves then the same result as if the pipe had been diameter reduced conventionally at the installation site itself.

The diameter reduction process takes place at a factory or workshop, for example, remote from the installation site. A liner pipe has its outside diameter temporarily reduced by passing it through a roller system (for example that described in EP0834034). Once the diameter has been reduced, the liner pipe is optionally quenched in a cooled fluid such as air or water before having a thermal restraint applied. The thermal restraint may be a temperature controlled environment in which the liner pipe is kept at or around +5° C. The liner pipe may be stored in this environment at the factory for a period of time; alternatively the liner pipe may be loaded immediately onto a refrigerated transport system which applies the desired thermal restraint, and transported to the installation site.

Depending on the liner pipe diameter, material and transport available, the liner pipe may be transported in a coiled, linear or folded configuration. The liner pipe may be transported in a number of shorter sections which can be joined together at the installation site into strings of suitable length suitable for insertion into the tubular structure.

Once the liner pipe arrives at the installation site, it may be stored on the transport for a period of time, or unloaded for immediate installation. Following removal of the thermal restraint, the liner pipe is allowed to warm to a suitable temperature for installation i.e. to carry out any normal preparatory site processes but before significant reversion takes place, and is then inserted into the tubular structure to be lined using any of a number of known techniques. Reversion begins once the thermal restraint is removed and can be accelerated by the application of pressurised hydraulic fluid to the interior of the liner pipe, forcing it radially outwardly towards its original diameter and into a close fit with the interior surface of the tubular structure which is being lined.

An example of the effect of a thermal restraint is shown below with side by side analysis of the same pipe processed and then stored at +5° C. (normal refrigerated temperature) and +23° C. The pipe in this assessment is a 160 mm outside diameter, 9.4 mm wall thickness, PE100 class polyethylene pipe (160 SDR 17 PE100).

|  | +5° C. | +23° C. |
|---|---|---|
| Initial roll down diameter | 146.0 | 146.0 |
| 48 hours | 147.6 | 149.0 |
| 72 hours | 147.7 | 149.3 |
| 96 hours | 148.2 | 150.4 |
| 192 hours | 148.3 | 150.5 |

For practical purposes the technique can be used to manufacture continuous liner pipe which can be processed in a factory and then packaged into a coil form, a normal method of packaging polymer pipes up to and including 315 mm diameter. Liner pipe of greater diameter can be processed and transported in non-coiled form. Liner pipe made and supplied in this way can be installed as a planned activity using commonly available construction equipment (i.e. pipe pushing machines and/or cable winch or mechanical pulling tools) to insert it into the tubular structure to be lined and then expanded using internal pressure, such as a water pump normally used for pressure testing the integrity of pipelines.

The methods described herein aim to make it economical to supply pipe liner for small length projects by diameter-reducing the polymer liner pipe in a workshop or factory environment and storing the pipe at a controlled temperature of +10° C. or less. The temperature chosen is optimised to be the most economic use of energy to restrict the elastic recovery (reversion) of the pipe liner long enough for it to be transported to the installation site and installed in the tubular structure to be lined. The thermal restraint may comprise a temperature range of −20° C. to +10° C. for storage/transport of the pipe liner.

Although the method has been described above in relation to lining a fluid transport pipeline (for example a gas or water pipeline), the method is equally usable in other applications, for example the lining of hydraulic or pneumatic cylinders and cylindrical or tubular storage vessels requiring internal corrosion protection and/or structural rehabilitation.

The method also has an unexpected additional advantage relating to the transport of coiled pipe. This advantage is not limited to the transport of liner pipes.

Many countries have a height restriction for heavy goods vehicles, this being based on a minimum clearance between the fully loaded vehicle and bridge structures over the road. In the United Kingdom, for example, this usually means that on suitable trailers, usually referred to as "low loaders" a haulier might reasonably expect to move objects no more than 4 m in height on the road network In the pipe industry, particularly one in which pipes are made from thermoplastic materials such as polyethylene, it is common to coil pipes for transport. For example a 100 m length of pipe might be coiled into a coil form having its own diameter and, with suitable restraints, the coil form held during transportation and handling.

If a pipe is coiled too tightly, a buckling collapse is induced in which the pipe creases and collapses, losing its desired coil form. For a given material type, density, pipe outside diameter and wall thickness, there is a minimum coiling diameter that would allow the pipe to be coiled but not so as to risk a buckling collapse.

An example of this in practice is the transportation of polyethylene pipes for gas and water distribution utility companies. In the UK, the 4 m ruling means that for practical purposes the largest pipe diameter that can be coiled is 180 mm, and in a PE80 or PE100 designation this pipe would need to have a minimum wall thickness of 10.2 mm to avoid collapse when making a coil from a 100 m length.

Such a pipe would be known geometrically as "180 SDR 17.6" where SDR is the standard dimension ratio (the outside diameter of the pipe divided by the wall thickness of the pipe).

For some utility companies, particularly gas utility companies, a 180 SDR 17.6 pipe is over-engineered in terms of its strength for the required end application. It is more than capable of supporting the soil structure around the pipe and of constraining the internal pressure in the pipe. They use it, however, because they want the benefit of a 100 m length of pipe for a more efficient installation.

In the interest of reducing material consumption, it is desirable to reduce the material content of pipes. In order to enable pipe to be transported in long lengths to construction sites, the above-described method is advantageous.

In the above-described method, pipe is reduced in outside diameter at a factory by passing it through a set of rollers that have elliptical openings which results in a temporary reduction in the outside diameter of the pipe. At the same time as the diameter is reduced, the wall thickness of the pipe can be increased. Once the outside diameter is temporarily reduced the pipe is stable and holds this form as described above.

As an example, a 155 SDR 21.0 pipe might be required for a particular installation application. Using conventional techniques, it cannot be coiled with confidence into a 100 m form without buckling collapse occurring. However, reducing the outside diameter of the pipe using the method described above results in a reduced size of the pipe (e.g. described as 140 SDR 17.6). This pipe, having a smaller outside diameter combined with a thicker wall, is now suitable for coiling into the form needed for transport, without risk of buckling collapse. Once the coiled pipe has been transported, its original outside diameter is recovered as described above.

Therefore, using the method described in the present application, it is possible to coil a pipe whose initial dimensions would normally result in a buckling collapse if it were coiled. This advantage is not limited to liner pipe.

Throughout the description and claims of this specification, the words "thermal restraint" mean the application of upper (and optionally lower) temperature limits to the item under thermal restraint. The item is thereby held at a temperature below the selected upper temperature limit. Thermal restraint may be achieved, for example, by placing the item in a temperature controlled environment, immersing the item in a cooled fluid, keeping the item outside in an ambient environment whose temperature is lower than the upper temperature limit or any combination of the above.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A method of preparing a plastics polyolefin pipe for transport, comprising:
   temporarily reducing an outside diameter of a polyolefin pipe by passing the pipe through a roll throat formed by at least one pair of opposing reducing rollers;
   cooling the reduced outside diameter pipe and applying a thermal restraint;
   transporting the thermally restrained pipe to an installation site remote from the at least one pair of opposing reducing rollers;
   removing said thermal restraint; and
   installing the pipe at said installation site,
   wherein the step of temporarily reducing an outside diameter of the pipe further comprises temporarily increasing a wall thickness of the pipe.

2. The method of claim 1, wherein said pipe is a liner pipe and the step of installing the pipe comprises installing the liner pipe in a section of a tubular structure at said installation site.

3. The method of claim 2, wherein the installation step comprises the steps of:
   allowing the liner pipe to warm to a suitable temperature for installation;
   inserting the liner pipe into the section of the tubular structure by pulling or pushing the liner pipe therethrough; and
   applying suitable closure fittings to ends of the liner pipe.

4. The method of claim 3, further comprising the step of filling the liner pipe with hydraulic fluid and pressurizing the hydraulic fluid to urge the liner pipe radially outwardly into a close fit with an interior surface of the section of the tubular structure and subsequently removing the pressurized hydraulic fluid.

5. The method of claim 3, further comprising the step of waiting until the liner pipe has a stable diameter in an unpressurized state then closing the ends using the closure fittings.

6. The method of claim 3, further comprising the step of connecting the section of the lined tubular structure to adjacent sections of unlined tubular structure.

7. The method of claim 2, wherein the pipe is transported in a coiled configuration.

8. The method of claim 7, wherein the temporary reduction in outside diameter and increase in wall thickness permits at least one of coiling of a longer length of liner pipe and coiling at a smaller bend radius than would otherwise be possible, without a buckling collapse.

9. The method of claim 1, wherein the thermal restraint is achieved by holding the pipe at a temperature in the range −20° C. to +10° C.

10. The method of claim 9, wherein the thermal restraint is achieved by holding the pipe at a temperature of +5° C.

11. The method of claim 2, wherein the tubular structure is a fluid transport pipeline.

12. The method of claim 1, wherein the pipe is pushed through the roll throat of said at least one pair of opposing reducing rollers from upstream thereof.

13. The method of claim 1, wherein said at least one pair of reducing rollers comprises part of a roller system which further comprises a series of rollers that form elliptical openings through which the pipe is passed.

14. The method of claim 1, wherein the step of temporarily reducing the outside diameter of the pipe comprises the steps of forcing the pipe from upstream thereof through said at least one pair of reducing rollers configured to present a roll throat of effective ovality wherein the percentage of the difference between a maximum dimension normal to the axes of a rotation and a maximum dimension parallel to the axes of rotation toward the maximum dimension normal to the axes of a rotation is in the range of 5%-30%.

15. The method of claim 1, wherein the cooling is achieved by applying the thermal restraint.

16. The method of claim 1, wherein the cooling is achieved by quenching the pipe in a fluid.

17. The method of claim 1, wherein the pipe is transported in a linear configuration.

18. The method of claim 1, wherein the transporting step is performed by a conventional refrigerated transport vehicle.

* * * * *